United States Patent [19]
Xie

[11] Patent Number: 5,764,810
[45] Date of Patent: Jun. 9, 1998

[54] SCREENLESS CONVERSION OF CONTINUOUS TONE IMAGES WITH ALTERABLE DOT SPACING PATTERNS

[75] Inventor: Zhenhua Xie, Naperville, Ill.

[73] Assignee: R.R. Donnelley & Sons Company, Inc., Lisle, Ill.

[21] Appl. No.: 575,909

[22] Filed: Dec. 20, 1995

[51] Int. Cl.$^6$ .................................................. H04N 1/40

[52] U.S. Cl. ..................... 382/252; 382/260; 382/263; 382/270; 382/275; 358/455; 358/458; 358/465

[58] Field of Search .......................... 358/455, 456, 358/458, 466, 465, 457, 454, 447, 298, 534, 533, 535, 462, 464; 382/252, 275, 270, 263, 260; 395/109, 106, 104

[56] References Cited

U.S. PATENT DOCUMENTS

| | | | |
|---|---|---|---|
| 5,111,310 | 5/1992 | Parker et al. | 358/456 |
| 5,225,915 | 7/1993 | Ciccone et al. | 358/454 |
| 5,243,443 | 9/1993 | Eschbach | 358/465 |
| 5,331,430 | 7/1994 | Xie et al. | 358/456 |
| 5,335,089 | 8/1994 | Xie et al. | 358/456 |
| 5,341,228 | 8/1994 | Parker et al. | 358/465 |
| 5,426,519 | 6/1995 | Banton | 358/534 |
| 5,528,384 | 6/1996 | Metcalf et al. | 358/465 |

OTHER PUBLICATIONS

Article entitled, "New Technology –Rethinking Screening, Stochastic/Frequency—Modulated Techniques Promise to Redefine The State–Of–The–Art In Printing", Publication unknown, Apr. 1994.

Primary Examiner—Edward L. Coles, Sr.
Assistant Examiner—Fan Lee
Attorney, Agent, or Firm—Marshall, O'Toole, Gerstein, Murray & Borun

[57] ABSTRACT

A system, which converts a continuous tone value undergoing conversion to an output value, generates first and second errors and an output. The first error is based upon (i) the continuous tone value undergoing conversion, (ii) output values corresponding to previously converted continuous tone values, output values predicted for continuous tone values yet to be converted, and an output value having an assumed first level for the continuous cone value undergoing conversion, and (iii) a matrix value based upon the continuous tone value undergoing conversion. The second error is based upon (i) the continuous tone value undergoing conversion, (ii) the output values corresponding to the previously converted continuous tone values, the output values predicted for the continuous tone values yet to be converted, and an output value having an assumed second level for the continuous tone value undergoing conversion, and (iii) the matrix value based upon the continuous tone value undergoing conversion. The continuous tone value undergoing conversion is set to an output value having the first level if the first error is less than the second error and to an output value having the second level if the first error is greater than the second error. Parts (ii) and (iii), in each instance, are conversely related so that the matrix value has greater influence at lower end continuous tone values and less influence at higher end continuous tone values.

77 Claims, 5 Drawing Sheets

$C_{1,1}\ C_{1,2}\ C_{1,3}\ C_{1,4}\ \ldots\ C_{1,256}\ C_{1,257}\ \ldots$ $C_{2,1}\ C_{2,2}\ C_{2,3}\ C_{2,4}\ \ldots\ C_{2,256}\ C_{2,257}\ \ldots$ $C_{3,1}\ C_{3,2}\ C_{3,3}\ C_{3,4}\ \ldots\ C_{3,256}\ C_{3,257}\ \ldots$ $C_{4,1}\ C_{4,2}\ C_{4,3}\ C_{4,4}\ \ldots\ C_{4,256}\ C_{4,257}\ \ldots$

$B_{1,1}\ B_{1,2}\ B_{1,3}\ B_{1,4}\ \ldots\ B_{1,256}\ B_{1,257}\ \ldots$ $B_{2,1}\ B_{2,2}\ B_{2,3}\ B_{2,4}\ \ldots\ B_{2,256}\ B_{2,257}\ \ldots$ $B_{3,1}\ B_{3,2}\ B_{3,3}\ B_{3,4}\ \ldots\ B_{3,256}\ B_{3,257}\ \ldots$ $B_{4,1}\ B_{4,2}\ B_{4,3}\ B_{4,4}\ \ldots\ B_{4,256}\ B_{4,257}\ \ldots$

FIG. 6
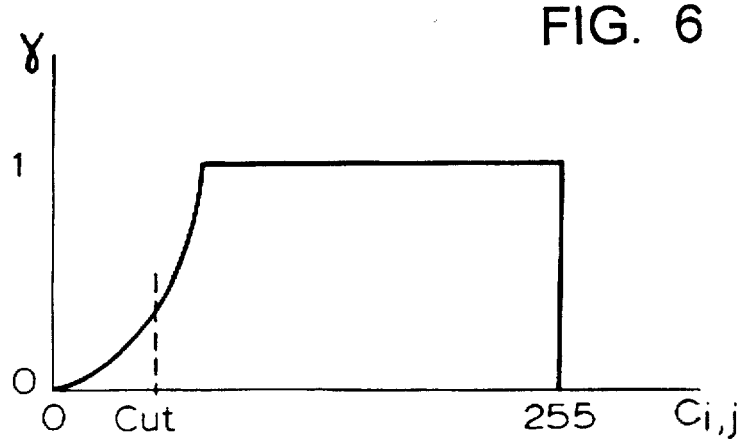
FIG. 7
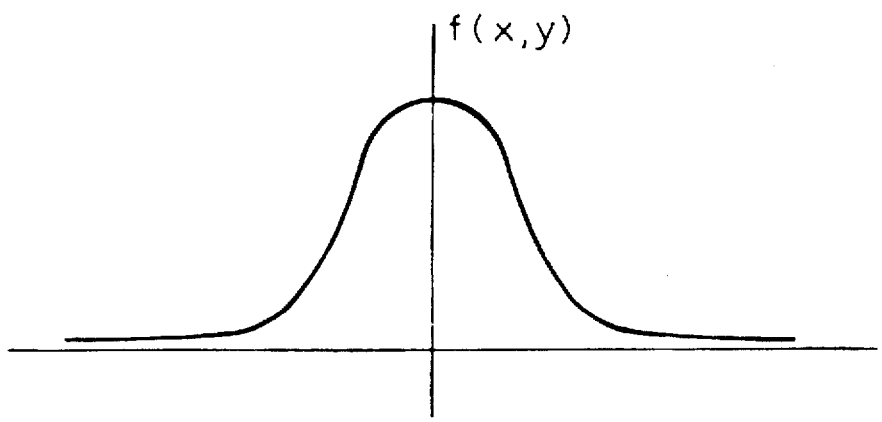
FIG. 8
$M_{1,1}$ $M_{1,2}$ $M_{1,3}$ $M_{1,4}$ ... $M_{1,256}$
$M_{2,1}$ $M_{2,2}$ $M_{2,3}$ $M_{2,4}$ ... $M_{2,256}$
$M_{3,1}$ $M_{3,2}$ $M_{3,3}$ $M_{3,4}$ ... $M_{3,256}$
$M_{4,1}$ $M_{4,2}$ $M_{4,3}$ $M_{4,4}$ ... $M_{4,256}$
.
.
.
$M_{256,1}$ $M_{256,2}$ $M_{256,3}$ $M_{256,4}$ ... $M_{256,256}$

SCREENLESS CONVERSION OF CONTINUOUS TONE IMAGES WITH ALTERABLE DOT SPACING PATTERNS

TECHNICAL FIELD OF THE INVENTION

The present invention relates to the conversion of input values, which are derived from an original image, into output values, which are to be rendered by a marking device. More particularly, the present invention relates to the screenless conversion of continuous tone values to output values so as to produce alterable dot spacing patterns when the output values are rendered.

BACKGROUND OF THE INVENTION

In lithographic printing systems, an original image to be reproduced is scanned by a scanner on a pixel-by-pixel basis, and the resulting scanned values are used to create one or more printing plates. When a monochrome (e.g., black and white) reproduction is to be printed, a single printing plate is produced. On the other hand, when a color reproduction is to be printed, a set of four plates are typically produced, one for each of the subtractive primary colors of magenta, cyan, and yellow, and one for black. The colored inks reproduce the hues of the original image, and the black ink produces a desired neutral density that cannot be attained by color inks alone. In addition, because black ink is less expensive than color inks, gray replacement (a form of undercolor removal) may be effected to replace quantities of the color inks with black ink. Such a process reduces the cost to produce the reproduction without significantly affecting the appearance thereof.

In traditional prior art lithographic half-tone reproduction systems, each printing plate includes a number of contiguous cells of equal size wherein each cell contains zero, one, or more elementary marks (or "microdots") clustered together to form a single large "dot" in the cell. More recently, systems have been devised wherein microdots are dispersed in a regular pattern in each cell. In other systems, microdots are dispersed in a random pattern on a medium. In each system, the number of elementary marks used to create a clustered dot, or a dispersed dot, depends upon the amount of ink to be applied to the substrate at the cell location. The amount of ink to be applied to the substrate at the cell location is, in turn, dependent upon the scanned value of the original image at a corresponding location thereof.

In the past, dots were formed within cells on a regular spacing or grid using a screen in a photochemical etching process. More recently, half-tone reproduction systems have utilized data processing equipment that electronically produces data representing a half-tone image. This data can be used to plot film or to directly form a printing plate without the use of an actual screen. However, the terms "screen" and "screening" are still used to define the dot pattern produced in a half-tone reproduction. For example, the term "screen ruling" specifies the distance between centers of adjacent cells of the plate. When the cells are all of the same size and regularly spaced, the plate is said to have a "regular screening." In such a case, a cell contains one period of the "screen."

Systems that reproduce half-tone images with regular screening (i.e., a regular dot pattern) have several drawbacks. For example, resolution is limited by screen ruling. Screen ruling is limited, in turn, by the minimum dot size and spacing that can be reliably and consistently printed. Moreover, regular dot patterns produced by regular screening in color reproduction result in moiré effects and color shifts caused by interference between the superimposed dot patterns. Such undesirable artifacts have been reduced in the past by superimposing the screens at angles with respect to one another. However, this technique is not entirely satisfactory because undesired effects are only minimized, not eliminated completely.

The prior art has reduced the effects of moiré and color shifts while at the same time enhancing the quality of the reproduction by eliminating the use of regular screens. Instead, a process known as "screenless" lithography (also referred to as random screening or random dot lithography) has been used to produce irregular (i.e., random) dot patterns on the printed page. The use of irregular dot patterns can eliminate visual interference caused by superimposition of the dot patterns, and hence moiré effects are substantially reduced or eliminated.

In one prior art system, a printing plate having an irregular grain structure is photographically exposed and chemically developed in a photolithographic process to produce an irregular dot structure. Such systems, however, cannot create consistent dot patterns from plate to plate.

Random screening has been electronically achieved using, for example, an error diffusion technique, such as the error diffusion technique described by Floyd and Steinberg in their paper "An Adaptive Algorithm for Spatial Greyscale," *Proceeding of the S.I.D.*, Vol. 17/2, Second Quarter, 1976. This paper discloses a reproduction system that compares each continuous tone value, which is sometimes referred to as a contone and which is obtained by scanning an original image, with a threshold to obtain a binary approximation of the continuous tone value. When a continuous tone value is less than the threshold, the continuous tone value is converted to a binary zero. On the other hand, if the continuous tone value is greater than the threshold, the continuous tone value is converted to a binary one. After conversion, the error resulting from the approximation of the continuous tone value is subdivided into error portions, and the error portions are summed in a prescribed pattern with neighboring continuous tone values yet to be converted so that such error is diffused. Each continuous tone value to be converted is thus a combination of its original continuous tone value plus any error portions diffused to it by the conversion of neighboring, previously converted continuous tone values. This process is repeated for each continuous tone value until all continuous tone values resulting from scanning of the original image have been converted to binary values. The result of this conversion of the continuous tone values produced by scanning an original image is typically a bit map. The bit map thus derived is used to produce a reproduction of the original image where the reproduction has dots at locations defined by the binary values in the bit map.

While the foregoing process is effective to reproduce half-tone images with random dots, it has been found that the dots still create artifacts in the reproduction. These artifacts detract from the visual appearance of the reproduction The conversion systems disclosed in Xie, et al. U.S. Pat. No. 5,331,430 and in Xie, et al. U.S. Pat. No. 5,335,089, which are assigned to the assignee of the instant application, further reduce such visible artifacts and perception errors by using a filter in order to remove noise which arises in the conversion process. In these conversion systems, a first error is produced by applying the filter (i) to the binary values resulting from the previous conversion of a selected number of continuous tone values which neighbor a continuous tone value undergoing conversion, (ii) to the binary values which result from a predicted conversion of a selected number of continuous tone values which are yet to be converted and which neighbor the continuous tone value undergoing conversion, and (iii) to a binary value having an assumed value of zero for the continuous tone value undergoing conversion. A second error is produced by applying the filter (i) to the binary values resulting from the previous conversion of the selected number of continuous tone values which neighbor the continuous tone value undergoing conversion, (ii) to the binary values which result from the predicted conversion of the selected number of continuous tone values which are yet to be converted and which neighbor the continuous tone value undergoing conversion, and (iii) to a binary value having an assumed value of one for the continuous tone value undergoing conversion. (Note that the binary values in both instances of (i) above are typically the same, and that the binary values in both instances of (ii) above are also typically the same.)

Once the first and second errors have been calculated, the continuous tone value undergoing conversion is set to a value of zero if the first error is less than the second error, and to a value of one if the first error is greater than the second error. If the continuous tone value undergoing conversion is set to a value of zero, the first error is diffused in a manner similar to that described by Floyd and Steinberg. On the other hand, if the continuous tone value undergoing conversion is set to a value of one, the second error is so diffused. Each continuous tone value is thus converted to a corresponding binary value which is typically stored in a bit map for rendering by a marking device.

Systems which produce random dot patterns, such as those described in the aforementioned Xie, et al. patents, produce greatly improved reproductions. However, certain regions, such as high tone regions having fewer dots per unit of area, are visually more pleasing if the spacing between dots in those regions is more regular than random. The present invention is directed to an arrangement and method which is capable of varying the dot spacing patterns between regions of a reproduction.

SUMMARY OF THE INVENTION

Therefore, in accordance with one aspect of the present invention, a method of converting continuous tone values to output values comprises the following steps: a) applying a first filter to a first continuous tone value which has a magnitude greater than a criterion; b) applying a second filter to a second continuous tone value which has a magnitude smaller than the criterion, wherein the first and second filters are different; and, c) setting the first and second continuous tone values to output values depending upon the results from steps a) and b).

In accordance with another aspect of the present invention, a method of converting continuous tone values to output values for rendering in the same reproduction comprises the following steps: a) converting a first group of continuous tone values to a first group of output values so that the output values of the first group of output values, when rendered, produce dots in a substantially random pattern; and, b) converting a second group of continuous tone values to a second group of output values so that the output values of the second group of output values, when rendered, produce dots in a substantially even pattern.

In accordance with yet another aspect of the invention, a system, which converts an input value undergoing conversion to an output value, includes first and second error generating means and an output value setting means. The first error generating means generates a first error for the input value undergoing conversion, wherein the first error is based upon first and second parts, wherein the second part is based upon an output value having an assumed first level for the input value undergoing conversion, and wherein the first and second parts are conversely related. The second error generating means generates a second error for the input value undergoing conversion, wherein the second error is based upon the first part and a third part, wherein the third part is based upon an output value having an assumed second level for the input value undergoing conversion, and wherein the first and third parts are conversely related. The output value setting means sets the input value undergoing conversion to an output value having the first level if the first error is less than the second error and to an output value having the second level if the first error is greater than the second error.

In accordance with still another aspect of the invention, a system, which converts an input value undergoing conversion to an output value, includes first and second error generating means and an output value setting means. The first error generating means generates a first error for the input value undergoing conversion, wherein the first error is based upon first and second parts, wherein the first part is based upon a filter, wherein the second part is based upon an output value having an assumed first level for the input value undergoing conversion, and wherein the first and second parts are conversely related. The second error generating means generates a second error for the input value undergoing conversion, wherein the second error is based upon third and fourth parts, wherein the third part is based upon the filter, wherein the fourth part is based upon an output value having an assumed second level for the input value undergoing conversion, and wherein the third and fourth parts are conversely related. The output value setting means sets the input value undergoing conversion to an output value having the first level if the first error is less than the second error and to an output value having the second level if the first error is greater than the second error.

In accordance with a further aspect of the invention, a screenless conversion method converts continuous tone values to output values representing dots to be rendered by a marking device, wherein the continuous tone values range between values of M and N. The screenless conversion method comprises the following steps: a) determining first errors corresponding to the continuous tone values so that the first errors produce generally evenly distributed dots for continuous tones values between about M and about Cut and so that the first errors produce generally randomly distributed dots for continuous tones values between Cut and N, wherein Cut is a value between M and N, and wherein the first errors are based upon an output value having an assumed first level for the continuous tone values; b) determining second errors corresponding to the continuous tone values so that the second errors produce generally evenly distributed dots for continuous tones values between about M and about Cut and so that the second errors produce generally randomly distributed dots for continuous tones values between Cut and N, wherein the second errors are based upon an output value having an assumed second level for the continuous tone values; c) setting those continuous tone values whose corresponding first errors are less than their corresponding second errors to output values having the first level; and, d) setting those continuous tone values whose corresponding first errors are greater than their corresponding second errors to output values having the second level.

In accordance with a still further aspect of the invention, a system converts one input value of a series of input values to an output value, wherein previous input values have been converted to previous output values and subsequent input values are to be converted to output values. The system includes first and second error generating means and an output value setting means. The first error generating means generates a first error for the one input value wherein the first error is based upon (i) the one input value, (ii) a selected number of previous output values, output values predicted for a selected number of subsequent input values, and an output value having an assumed first level for the one input value, and (iii) an output value having an assumed second level for the one input value. The second error generating means generates a second error for the one input value wherein the second error is based upon (i) the one input value, (iv) the selected number of previous output values, the output values predicted for the selected number of subsequent input values, and an output value having an assumed third level for the one input value, and (iii) the output value having the assumed second level for the one input value. The output value setting means sets the one input value to an output value having the first level if the first error is less than the second error and to an output value having the third level if the first error is greater than the second error.

BRIEF DESCRIPTION OF THE DRAWINGS

These and other features and advantages will become more apparent from a detailed consideration of the invention when taken in conjunction with the drawings in which:

FIG. 2 illustrates an example of an input continuous tone value array useful in explaining the present invention;

FIG. 3 illustrates an example of an output binary value array useful in explaining the present invention;

FIG. 6 illustrates a plot of $\gamma$ which is a function useful in implementing the present invention;

FIG. 7 illustrates the curve of a filter which is employed in implementing the present invention; and, FIG. 8 illustrates an example of a matrix useful in explaining the present invention.

DETAILED DESCRIPTION OF THE PREFERRED EMBODIMENT

Figure 1A:
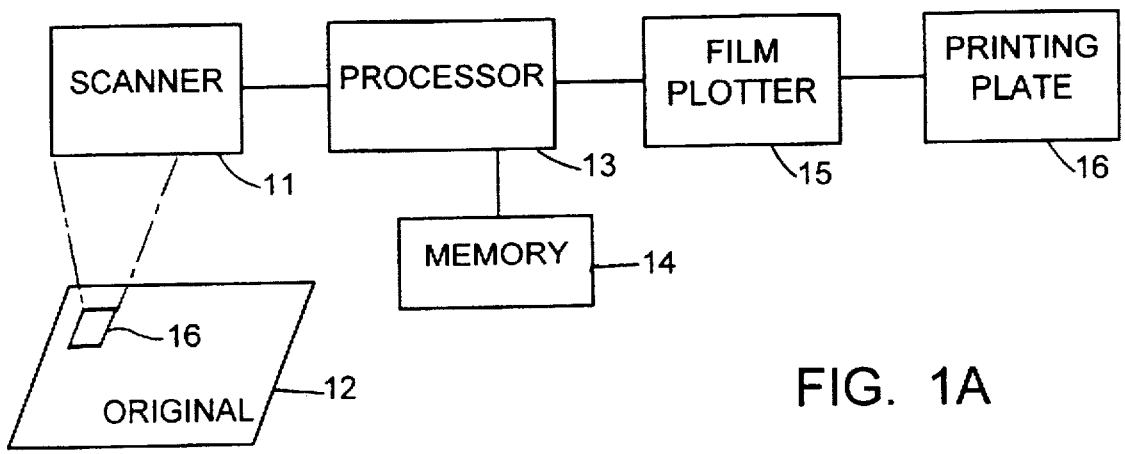
FIGS. 1A, 1B, and 1C comprise block diagrams illustrating three exemplary environments in which the present invention may be used.
Figure 1B:
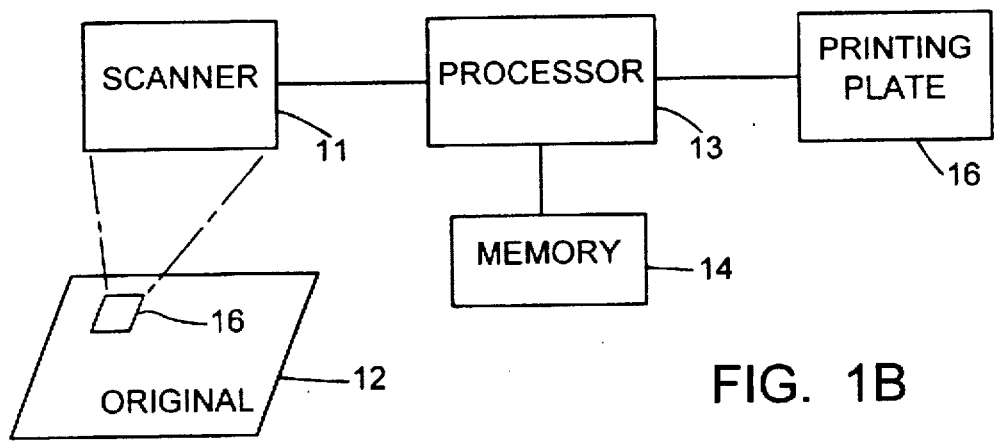

FIGS. 1A and 1B, which are similar to FIGS. 1A and 1B of Xie, et al. U.S. Pat. No. 5,331,430 and Xie, et al. U.S. Pat. No. 5,335,089, illustrate two environments in which the present invention may be used. The disclosures in Xie, et al. U.S. Pat. No. 5,331,430 and Xie, et al. U.S. Pat. No. 5,335,089 are incorporated herein by reference. As shown in FIG. 1A, the present invention is particularly useful as part of an image reproduction system 10A. The reproduction system 10A includes a scanner 11 which scans or samples each pixel, such as a pixel 16, of an original 12. Each pixel of the original 12 is converted by the scanner 11 into typically an eight-bit digitized continuous tone value which is supplied to a processor 13 and which is stored in a memory 14. (This eight bit digitized continuous tone value may also be referred to as a contone or may be referred to more generally as an input value.)

Because eight bits are used, each continuous tone value has an amplitude resolution of 256 different levels which may be supplied by the scanner 11. Thus, the scanner 11 supplies one of 256 possible continuous tone values for each pixel.

The processor 13, which may be in the form of a general purpose computer, converts the continuous tone values into output values which, in one embodiment of the present invention, have only two levels, and hence are referred to as half-tone binary values or more simply as binary values. (However, it should be understood that the output values may have more than two levels.) These binary values are stored in the memory 14 and are used by a film plotter 15 to plot a film which in turn is used by a block 16 to create a printing plate.

Alternatively, as shown in FIG. 1B, the binary values can be used directly in the formation of printing plates without the necessity of first creating a film.

The printing plate, whether created directly or by film, can then be used in a printer, such as an offset printer, for reproducing the original 12.

Figure 1C:
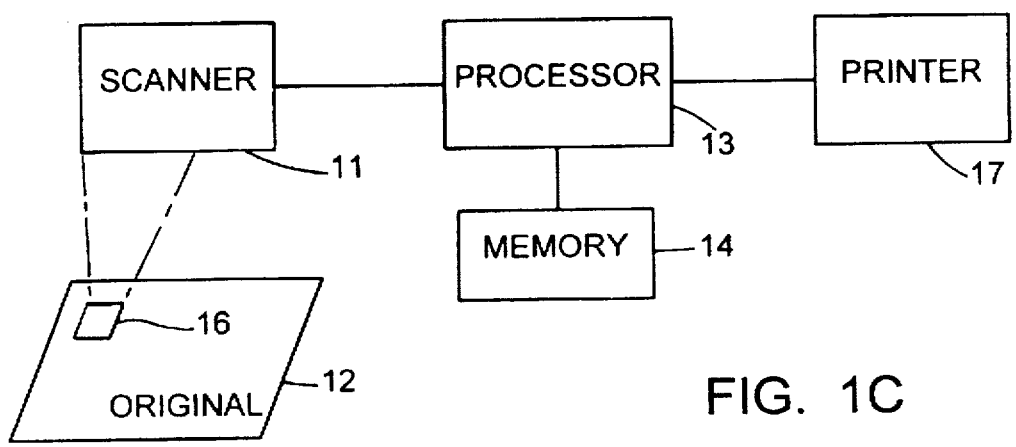

In still other alternatives, the binary values can be used directly by printers such as those used in conjunction with personal computers. For example, as shown in FIG. 1C, the present invention is useful in order to directly control a printer 17. A reproduction system 10C includes the scanner 11 which scans or samples each pixel, such as the pixel 16, of the original 12. Each pixel of the original 12 is converted by the scanner 11 into an eight-bit digitized continuous tone value which is supplied to the processor 13 and which is stored in the memory 14. Each eight-bit digitized continuous tone value is converted by the processor 13 into one or more binary values. All such binary values are stored in the memory 14 and are directly used by the printer 17 to reproduce the original 12.

For ease in understanding the present invention, it is useful to envision the continuous tone values, and the binary values to which the continuous tone values are converted, as being stored in corresponding first and second arrays in the memory 14, although the data need not be physically stored as such. For example, the continuous tone values, which result from scanning the original 12, which are stored in the memory 14, and which are converted to binary values by the processor 13, may be envisioned as shown in FIG. 2. As shown in FIG. 2, the continuous tone values resulting from scanning a first line of the original 12 are stored as a first row of continuous tone values. That is, the first continuous tone value resulting from scanning the first line of the original 12 is stored as a continuous tone value $C_{1,1}$, the second continuous tone value resulting from scanning the first line of the original 12 is stored as a continuous tone value $C_{1,2}$, and so on until scanning of the first line of the original 12 is completed. The continuous tone values resulting from scanning the second line of the original 12 are stored as a second row of continuous tone values. That is, the first continuous tone value resulting from scanning the second line of the original 12 is stored as a continuous tone value $C_{2,1}$, the second continuous tone value resulting from scanning the second line of the original 12 is stored as a continuous tone value $C_{2,2}$, and so on until scanning of the second line of the original 12 is completed. The remaining lines of the original 12 are scanned to similarly fill the remaining rows of the array of continuous tone values shown in FIG. 2.

Similarly, the binary values, which result from the conversion of the continuous tone values shown in FIG. 2, which are stored in the memory 14, and which are supplied as a bit map by the processor 13 to a marking device, may be envisioned as shown in FIG. 3. That is, the first binary value is stored in a first row as a binary value $B_{1,1}$, the second binary value is stored in the first row as a binary value $B_{1,2}$, and so on for the first row. The next binary value is stored in a second row as a binary value $B_{2,1}$, the next binary value is stored in the second row as a binary value $B_{2,2}$, and so on for the second row. The remaining rows of the array of binary values as shown in FIG. 3 contain similar binary values.

It should be noted that, depending upon the particular implementation of the present invention, there may not necessarily be a one-to-one correspondence between the continuous tone values of FIG. 2 and the binary values of FIG. 3. However, if the present invention is implemented as a modification of the aforementioned Xie, et al. patents, there will be a one-to-one correspondence between the continuous tone values of FIG. 2 and the binary values of FIG. 3.

It should also be noted that, as is known, the ratio of the size of the original to the size of the reproduction may be controlled as desired. For example, if each continuous tone value is converted to n corresponding binary values and the size of the reproduction is to be the same as the size of the original, the scanner should be configured to scan at 1/n resolution. Known publishing software may be alternatively used to produce the desired ratio.

The location of each binary value in the output bit map provided by the processor 13 is used to determine the location of a dot, and the specific value of the binary value determines whether or not a dot is marked. Whether a binary zero or a binary one results in the marking of a dot depends upon the type of printing to be performed. The array of binary values as a whole, however, defines a pattern of dots to be marked, and this pattern will result in reproduction of the original when printed.

If the original 12 is to be reproduced using only one ink, e.g. black, the processor 13 stores and supplies only one set of binary values such as those shown in FIG. 3. The number of dots in a given area controls the amount of grayness in that area of the reproduced image, and the pattern of dots represents the image of the original. In the event the system is used for color reproduction, the scanner 11 uses color filters to produce three arrays or sets of continuous tone values, one for each of the three primary additive colors red, green and blue. Alternatively, the scanner 11 may use color filters to produce three arrays or sets of continuous tone values, one for each of the three primary subtractive colors yellow, magenta and cyan. If the three arrays representing the three primary colors are to be translated to four arrays representing the four printing colors of cyan, magenta, yellow and black, the processor 13 will do so. The processor 13 converts each array of continuous tone values to a corresponding array (i.e., bit map) of binary values. The film plotter 15 then uses each array of binary values to plot a separate film for each of the colors to be printed, or each array is used directly to form a separate printing plate for each of the printing colors. During printing, as is well known, each printing plate separately lays down its associated color on the paper or other substrate on which the original is being reproduced. Alternatively, each array is used by a printer to lay down a different color on paper or other substrate. The colors are combined by the human visual system to reproduce the colors of the original 12.

The processor 13 may execute the program disclosed in either of the aforementioned Xie, et al. patents when such program is modified in accordance with the description below. The programs shown in these Xie patents are reproduced in summary form in FIG. 4 as a program 20. Generally, the screenless conversion system disclosed in the aforementioned Xie, et al. patents is an error diffusion system in which (1) an error $e_0$ is determined by applying a filter (i) to an assumed value of zero for a continuous tone value undergoing conversion, (ii) to binary values corresponding to continuous tone values which have already been converted and which neighbor the continuous tone value undergoing conversion, and (iii) to predicted binary values corresponding to continuous tone values which are yet to be converted and which neighbor the continuous tone value undergoing conversion, and (2) an error $e_1$ is determined by applying the filter (i) to an assumed value of one for the continuous tone value undergoing conversion, (ii) to the binary values corresponding to the continuous tone values which have already been converted and which neighbor the continuous tone value undergoing conversion, and (iii) to the predicted binary values corresponding to the continuous tone values which are yet to be converted and which neighbor the continuous tone value undergoing conversion.

Then, the continuous tone value undergoing conversion is set to a one if the error $e_0$ is larger than the error $e_1$, and otherwise the continuous tone value undergoing conversion is set to a zero. If the continuous tone value undergoing conversion is set to a zero, the error $e_0$ is diffused. On the other hand, if the continuous tone value undergoing conversion is set to a one, the error $e_1$ is diffused.

Figure 4:
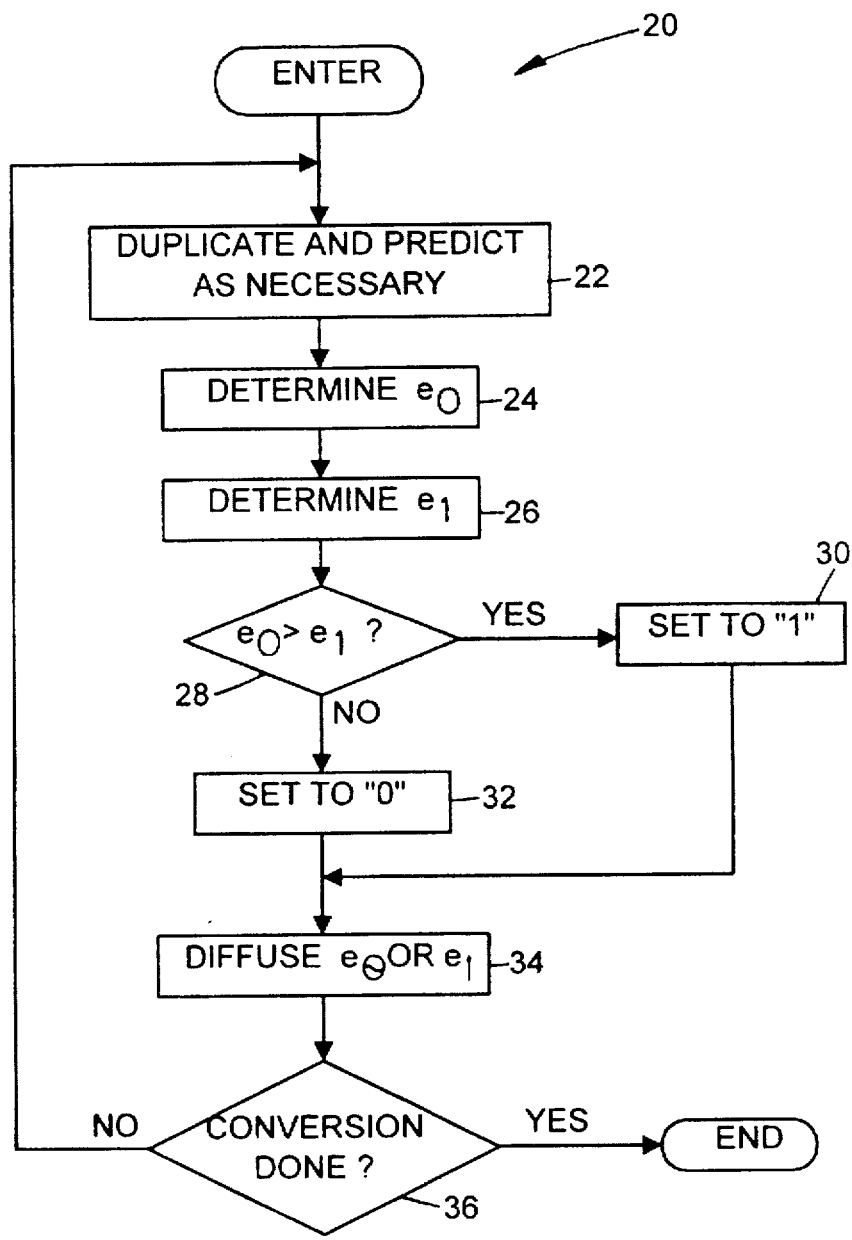
FIG. 4 illustrates a flow chart of a program which may be executed in accordance with the present invention.

More specifically, as illustrated in FIG. 4 herein, a block 22 of the program 20 duplicates continuous tone values and predicts binary values from these continuous tone values, as necessary. For example, during conversion of a continuous tone value to a binary value, the conversion systems of the aforementioned Xie, et al. patents apply a filter to forty-nine binary values. These forty-nine binary values include (i) one binary value which is assumed for the continuous tone value undergoing conversion, (ii) twenty-four binary values corresponding to twenty-four continuous tone values which have yet to be converted and which are close in neighborhood to the continuous tone value undergoing conversion, and (iii) twenty-four binary values corresponding to twenty-four continuous tone values which have been previously converted and which are close in neighborhood to the continuous tone values undergoing conversion. However, when the first input continuous tone value $C_{1,1}$ shown in FIG. 2 is converted to a binary value, no other continuous tone values have been previously converted.

Therefore, twenty-four binary values corresponding to twenty-four continuous tone values which have already been converted and which are close in neighborhood to the continuous tone value undergoing conversion do not yet exist.

In order to provide these twenty-four binary values, the block 22, as taught by the aforementioned Xie, et al. patents, duplicates the first row and first column of the input continuous tone values three times. Binary values are then predicted for the original first row and the three duplicated rows of continuous tone values. This prediction may be made by comparing each of these continuous tone values to a threshold. If a continuous tone value is above the threshold, that continuous tone value is set to a binary value of one. On the other hand, if the continuous tone value is below the threshold, that continuous tone value is set to a binary value of zero. Consequently, twenty-four binary values are provided for each of the continuous tone values in the first three rows and columns of the input continuous tone values.

Furthermore, as discussed above, during conversion of a continuous tone value to a binary value, the conversion system of the aforementioned Xie, et al. patents also applies the filter to twenty-four binary values corresponding to twenty-four continuous tone values which have yet to be converted and which are close in neighborhood to the continuous tone value undergoing conversion. However, because there can be no binary values resulting from the conversion of continuous tone values which have yet to be converted, the block 22, again as taught by the aforementioned Xie, et al. patents, predicts binary values for twenty-four continuous tone values which have yet to be converted and which are close in neighborhood to the continuous tone value undergoing conversion. This prediction may also be made by comparing each of these twenty-four continuous tone values to a threshold. If a continuous tone value is above the threshold, that continuous tone value is set to a binary value of one. On the other hand, if the continuous tone value is below the threshold, that continuous tone value is set to a binary value of zero. Consequently, twenty-four binary values corresponding to twenty-four continuous tone values which have yet to be converted and which are close in neighborhood to the continuous tone value undergoing conversion are provided.

After the continuous tone values have been duplicated and binary values have been predicted, as necessary, the errors $e_0$ and $e_1$ are determined by blocks 24 and 26 in accordance with a modified version of the equations disclosed in the Xie, et al patents. If the conversion system disclosed in the Xie, et al., U.S. Pat. No. 5,331,430 is used for the present invention, the errors $e_0$ and $e_1$ are determined as follows:

$$e_0 = C_{i,j} - (\Sigma b_{19a} \cdot W_{20a} + "0" \cdot W_{4,4} + \Sigma b_{19b} \cdot W_{20b}) \cdot \gamma[C_{i,j}] - \quad (1)$$
$$(1 - \gamma[C_{i,j}]) \cdot Mat[imod256, jmod256]$$

and $$e_1 = C_{i,j} - (\Sigma b_{19a} \cdot W_{20a} + "1" \cdot W_{4,4} + \Sigma b_{19b} \cdot W_{20b}) \cdot \gamma[C_{i,j}] - \quad (2)$$
$$(1 - \gamma[C_{i,j}]) \cdot Mat[imod256, jmod256]$$

where $C_{i,j}$ represents the continuous tone value undergoing conversion, where $b_{19a}$ represents the binary values corresponding to the continuous tone values which have already been converted (or which represent the binary values resulting from the duplication and prediction of continuous tone values) and which are close in neighborhood to the continuous tone value $C_{i,j}$, where $b_{19b}$ represents the binary values predicted from those continuous tone values yet to be converted which are close in neighborhood to the continuous tone value $C_{i,j}$, where "0" represents an assumed binary value of zero for the continuous tone value $C_{i,j}$, where "1" represents an assumed binary value of one for the continuous tone value $C_{i,j}$, where $W_{20a}$ represents those elements of a filter which are applied to the $b_{19a}$ binary values, where $W_{20b}$ represents those elements of the filter which are applied to the $b_{19b}$ binary values, where $W_{4,4}$ represents the element of the filter which is applied to the assumed binary value of zero or one, as appropriate, where $\gamma$ represents a value determined as a function of $C_{i,j}$ and will be described hereinafter in more detail, and where Mat[ ] is a value selected from a matrix Mat on the basis of $C_{i,j}$ and will be described hereinafter in more detail. The matrix Mat may be stored in the memory 14.

Accordingly, equations (1) and (2) have three parts. The first part of equations (1) and (2) is the continuous tone value undergoing conversion, $C_{i,j}$. The second part of equations (1) and (2) is the neighborhood calculation as influenced by $\gamma$. The third part of equations (1) and (2) is a value Mat[ ] of the matrix Mat as influenced by the complement of $\gamma$. Accordingly, the second and third parts of equation (1) are conversely related, and the second and third parts of equation (2) are conversely related.

The value of $\gamma$ is a function of the continuous tone value undergoing conversion, $C_{i,j}$, and may be given by the following equation:

$$1 - \gamma[C_{i,j}] = \frac{1}{1 + \left(\frac{C_{i,j}}{Cut}\right)^{2\alpha}} \quad (3)$$

where $\alpha$ is a constant (which, for example, may be set equal to four), where Cut is a constant (which, for example, may be set equal to twelve), and where $C_{i,j}$ is the continuous tone value undergoing conversion.

FIG. 6 illustrates a plot of $\gamma$ versus $C_{i,j}$ in accordance with equation (3). As shown in FIG. 6, $\gamma$ varies from a value of zero to a value of one as the magnitude of $C_{i,j}$ varies from a value zero to a value somewhat larger than Cut. Thereafter, $\gamma$ remains at a value of one for the remaining values of $C_{i,j}$. If Cut is chosen to have a value of twelve, any continuous tone values, $C_{i,j}$, having a magnitude between a value of zero and a value of about twenty will produce a corresponding value for $\gamma$ between a value of zero and a value of one. For continuous tone values having a magnitude above the value of about twenty, $\gamma$ approaches a value of one.

Accordingly, for continuous tone values having a magnitude greater than about twenty, the second parts of the equations (1) and (2) involving the neighborhood calculation have a substantially unreduced influence on the values of the errors $e_0$ and $e_1$ relative to the third parts of these equations, and the third parts of the equations (1) and (2) involving the matrix MAT have substantially no influence on the values of the errors $e_0$ and $e_1$. However, for continuous tone values having a magnitude of between zero and about twenty, the second parts of the equations (1) and (2) involving the neighborhood calculation and the third parts of the equations (1) and (2) involving the matrix MAT have a relative influence on the values of the errors $e_0$ and $e_1$ dependent upon the magnitude of the continuous tone value $C_{i,j}$.

For example, if the continuous tone value $C_{i,j}$ has a magnitude of zero, the second parts of the equations (1) and (2) involving the neighborhood calculation contribute nothing to the determination of the errors $e_0$ and $e_1$ because $\gamma$ is zero when the magnitude of the continuous tone value $C_{i,j}$ is zero. On the other hand, the third parts of the equations (1) and (2) involving the matrix MAT have unreduced influence on the determination of the errors $e_0$ and $e_1$ because $1-\gamma$ is one when the magnitude of the continuous tone value $C_{i,j}$ is zero.

As another example, if the continuous tone value $C_{i,j}$ has a magnitude of twenty, the second parts of the equations (1) and (2) involving the neighborhood calculation have a substantially unreduced influence on the determination of the errors $e_0$ and $e_1$ because $\gamma$ is essentially one when the magnitude of the continuous tone value $C_{i,j}$ is twenty. On the other hand, the third parts of the equations (1) and (2) involving the matrix MAT contribute essentially nothing to the determination of the errors $e_0$ and $e_1$ because $1-\gamma$ is essentially zero when the magnitude of the continuous tone value $C_{i,j}$ is twenty. As yet another example, if the continuous tone value $C_{i,j}$ has a magnitude of ten, the second parts of the equations (1) and (2) involving the neighborhood calculation have only about twenty per cent of the influence on the determination of the errors $e_0$, and $e_1$ that they would have had but for $\gamma$ because $\gamma$ is about 0.2 when the magnitude of the continuous tone value $C_{i,j}$ is ten. On the other hand, the third parts of the equations (1) and (2) involving the matrix MAT have about eighty per cent of the influence on the determination of the errors $e_0$ and $e_1$ that they would have had but for $\gamma$ because $1-\gamma$ is about 0.8 when the magnitude of the continuous tone value $C_{i,j}$ is ten.

The matrix MAT and $\gamma$ are arranged in equations (1) and (2) to even out the spacing between the dots, which are marked as a result of the binary values to which continuous tone values are converted, in the high tone regions of a reproduction corresponding to regions in the original from which continuous tone values having small magnitudes are produced. Thus, for magnitudes of continuous tone values less than about twenty, the third parts of the equations (1) and (2) involving the matrix MAT have sufficient influence on the determination of the errors $e_0$ and $e_1$ that the dots resulting from converting continuous tone values having these small magnitudes are more evenly spaced in the reproduction than in other regions of the reproduction.

On the other hand, when the magnitudes of continuous tone values produced from regions of the original are greater than about twenty, the influence from the third parts of the equations (1) and (2) involving the matrix MAT is substantially removed from the determination of the errors $e_0$ and $e_1$, and the second parts of the equations (1) and (2) involving the neighborhood calculation have a substantially unreduced influence on the determination of the errors $e_0$ and $e_1$. Accordingly, the dots which are marked in corresponding regions of the reproduction are more randomly spaced than in the high tone regions.

Thus, the dots in the high tone regions of a reproduction are more evenly spaced than the dots in the other regions of the reproduction, whereas the dots in the other regions of the reproduction are more randomly spaced than the dots in the high tone regions of the reproduction, so as to produce a more pleasing reproduction.

Alternatively, the equations disclosed in the Xie, et al. U.S. Pat. No. 5,335,089 for calculating the errors $e_0$ and $e_1$ may be modified according to the following equations:

$$e_0 = C_{i-3,n} - (u + "0" \cdot W_4^2) \cdot \gamma[C_{i-3,n}] - \quad (4)$$

$$(1 - \gamma[C_{i-3,n}]) \cdot Mat[(i-3)mod256, nmod256].$$

and $$e_1 = C_{i-3,n} - (u + "1" \cdot W_4^2) \cdot \gamma[C_{i-3,n}] - \quad (5)$$

$$(1 - \gamma[C_{i-3,n}]) \cdot Mat[(i-3)mod256, nmod256].$$

where $C_{i-3,n}$ represents the continuous tone value undergoing conversion, where u is a filtered quantity calculated in accordance with the teachings of this Xie, et al. patent, where "0" represents an assumed binary value of zero for the continuous tone value $C_{i-3,n}$, where "1" represents an assumed binary value of one for the continuous tone value $C_{i-3,n}$, where $\gamma$ represents a value determined as a function of $C_{i-3,n}$ as described hereinabove, where $W_4$ represents the center element of a filter and is applied to the assumed binary value of zero or one, as appropriate, and where Mat[ ] is a value selected from the matrix Mat on the basis of $C_{i-3,n}$ and will be described hereinafter in more detail.

Once the errors $e_0$ and $e_1$ are determined according to the blocks 22 and 24 of FIG. 4, a block 28 determines whether the error $e_0$, is larger than the error $e_1$. If the error $e_0$ is larger than the error $e_1$, a block 30 sets the continuous tone value undergoing conversion to a binary value of one. On the other hand, if the error $e_0$ is not larger than the error $e_1$ a block 32 sets the continuous tone value undergoing conversion to a binary value of zero. After the block 30 sets the continuous tone value undergoing conversion to a binary value of one, or after the block 32 sets the continuous tone value undergoing conversion to a binary value of zero, a block 34 diffuses the error $e_0$, or the error $e_1$, as appropriate.

That is, if the continuous tone value undergoing conversion is set to a binary value of zero, the block 34 diffuses the error $e_0$. On the other hand, if the continuous tone value undergoing conversion is set to a binary value of one, the block 34 diffuses the error $e_1$. The diffusion pattern for the diffusion of these errors may be similar, for example, to that taught by Floyd and Steinberg.

After diffusion of the appropriate error, a block 36 determines whether all continuous tone values have been converted to binary values. If not, the program 20 returns to the block 22 to convert the next continuous tone value. When the block 36 determines that all continuous tone values have been converted to binary values, the conversion process is terminated.

The value Mat[ ], which is selected from the matrix MAT and which is used in equations (1) and (2) or in equations (4) and (5), is selected dependent upon the position of the continuous tone value undergoing conversion in the input continuous tone value array, such as that shown in FIG. 2. For ease of discussion hereinafter, the continuous tone value undergoing conversion is designated $C_{i,j}$ for both the equation (1) and (2) implementation and the equation (4) and (5) implementation; even though the continuous tone value undergoinq conversion is designated $C_{i-3,n}$ for the equation (4) and (5) implementation.

An exemplary input continuous tone value array is shown in FIG. 2. When the continuous tone value undergoing conversion is the first continuous tone value to undergo conversion, the continuous tone value at the $C_{1,1}$ position of the array of FIG. 2 is substituted for $C_{i,j}$ in the appropriate set of equations (1) and (2) or (4) and (5). Also, the continuous tone value at the $C_{1,1}$ position in the array of FIG. 2 is inserted into equation (3) for the quantity $C_{i,j}$ in order to determine the value of $\gamma$. Accordingly, both $\gamma$ and $1-\gamma$ may be determined and substituted into the appropriate set of equations. Moreover, the $C_{1,1}$ position in the array of FIG. 2 determines the position from which the matrix value $M_{i,j}$ is selected from the matrix Mat. In this case, the matrix value at the position $M_{1,1}$ is selected for substitution into the appropriate set of equations because the position $M_{1,1}$ in the matrix Mat corresponds to the position $C_{1,1}$ in the input continuous tone value array. Thus, the matrix value $M_{1,1}$ is substituted into the appropriate set of equations for Mat [imod256, jmod256].

Similarly, when the continuous tone value undergoing conversion is the continuous tone value at the $C_{1,2}$ position, the matrix value at the position $M_{1,2}$ is selected for substitution into the appropriate set of equations, when the continuous tone value undergoing conversion is the continuous tone value at the $C_{1,3}$ position, the matrix value at the position $M_{1,3}$ is selected for substitution into the appropriate set of equations, . . . and when the continuous tone value undergoing conversion is the continuous tone value at the $C_{1,256}$ position, the matrix value at the position $M_{1,256}$ is selected for substitution into the appropriate set of equations. However, when the continuous tone value undergoing conversion is the continuous tone value at the $C_{1,257}$ position the matrix value at the position $M_{1,1}$ is again selected for substitution into the appropriate set of equations, because the matrix Mat is only 256×256 in extent, which is typically smaller than the input continuous tone array. This operation is indicated by the module 256 function in the third parts of equations (1), (2), (4), and (5).

Figure 5:
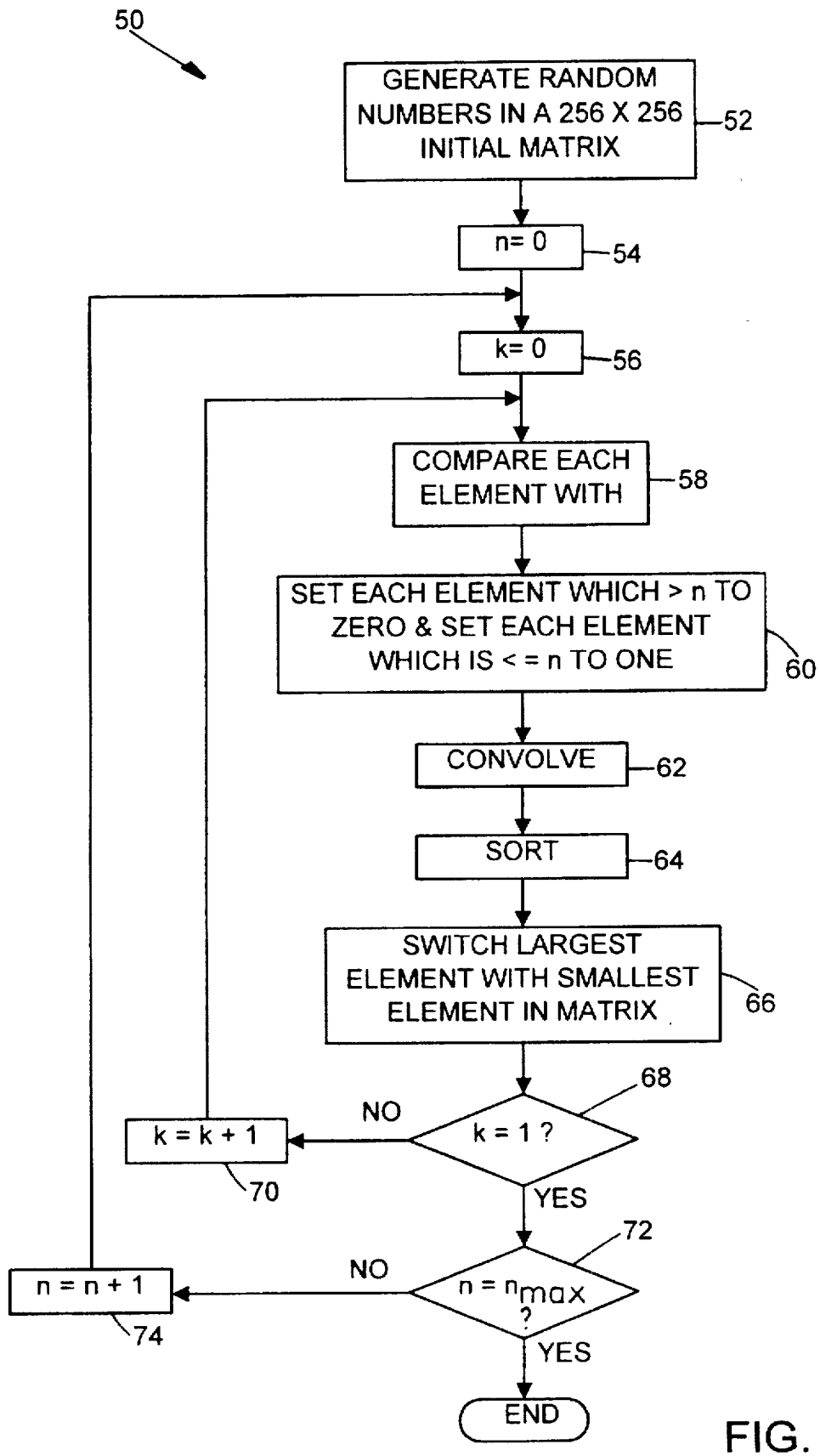
FIG. 5 illustrates a flow chart of a program which may be executed in order to produce a filter useful in implementing the present invention.

The matrix MAT may be assembled by use of a program 50 which is shown in FIG. 5. A block 52 of the program 50 generates a random number 256×256 initial matrix. In generating the random number 256×256 initial matrix, the block 52 operates according to predetermined constraints. The random number 256×256 initial matrix is divided into 256 16×16 non-overlapping submatrices. The random numbers generated by the block 52 are confined to a range of zero to 255. Each 16×16 submatrix of the initial matrix must contain each number from zero to 255. Accordingly, the block 52 randomly distributes the numbers between zero and 255 in each 16×16 submatrix within the 256×256 initial matrix. Finally, the random distribution of numbers within each 16×16 submatrix of the 256×256 initial matrix is independent of the random distribution of numbers in any of the other 16×16 submatrices.

After the 256×256 initial matrix is generated by the block 52, a block 54 sets a variable n to zero, and a block 56 sets a variable k to zero. A block 58 then compares each element in the 256×256 initial matrix with the value of n. A block 60 constructs a 256×256 temporary matrix by setting to zero those elements in the 256×256 temporary matrix which correspond to those elements in the 256×256 initial matrix that are greater than n, where currently n=zero. The block 60 sets the remaining elements in the temporary matrix to one.

A block 62 then convolves the elements of the temporary matrix with a filter f(x,y) which is defined by the following equation:

$$f(x, y) = \frac{1}{\sqrt{2\pi} \, \sigma} e^{-\frac{x^2+y^2}{2\sigma^2}} \quad (6)$$

where $$\sigma = \frac{c}{dv + B}, \quad (7)$$

where x represents the row number of an element in the temporary matrix, where y represents the column number of the element in the temporary matrix, where c represents a constant (which, for example, may have a value of $\sqrt{2\pi}$), where dv represents the digital value of the current value of n as set initially by the block 54 and as incremented by the block 74, and where B is a constant (which, for example, may have a value of $\sqrt{2\pi}/10$). The constant B in equation (7) prevents $\delta$ from being indeterminate when the digital value dv is zero (i.e., when n=0).

FIG. 7 generally illustrates the shape of the curve of the filter f(x,y). This filter f(x,y) is a function of the coordinates x and y.

The result of this convolution is a 256×256 convolution matrix. The position of each element in the 256×256 convolution matrix corresponds to a position of a value in the 256×256 initial matrix. The elements in each of the 256 non-overlapping 16×16 submatrices of the 256×256 convolution matrix are sorted from highest to lowest by a block 64. A block 66 switches the value in the first 16×16 submatrix of the 256×256 initial matrix corresponding to the highest value in the first 16×16 submatrix of the 256×256 convolution matrix with the value in the first 16 ×16 submatrix of the 256×256 initial matrix corresponding to the lowest value in the first 16×16 submatrix of the 256×256 convolution matrix.

Similarly, the block 66 switches the value in the second 16×16 submatrix of the 256×256 initial matrix corresponding to the highest value in the second 16×16 submatrix of the 256×256 convolution matrix with the value in the second 16×16 submatrix of the 256×256 initial matrix corresponding to the lowest value in the second 16×16 submatrix of the 256×256 convolution matrix. The remaining 16×16 submatrices of the 256×256 initial matrix are similarly processed by the block 66.

Thereafter, a block 68 determines whether the variable k is equal to one. If the variable k is not equal to one, a block 70 increments the variable k by one, and the program 50 returns to the block 58 where the functions performed by the blocks 58 through 66 are again executed with the variable n still currently set to zero. Accordingly, the block 58 then compares each element in the new 256×256 initial matrix with the value of n, where currently n=zero. The block 60 constructs a new 256×256 temporary matrix by setting to zero those elements in the new 256×256 temporary matrix which correspond to those elements in the new 256×256 initial matrix that are greater than n, where currently n=zero. The block 60 sets the remaining elements in the new 256×256 temporary matrix to one.

The block 62 then convolves the elements of the new temporary matrix with the filter f(x,y). The result of this convolution is a new 256×256 convolution matrix. The elements in each of the 256 non-overlapping 16×16 submatrices of the new 256×256 convolution matrix are sorted from highest to lowest by the block 64. The block 66 then switches the values in each 16×16 submatrix of the new 256 ×256 initial matrix as before. The block 68 then determines that the variable k is now equal to one and flow passes to a block 72.

The block 72 determines whether the variable n is equal to $n_{max}$ (which, for example, may be set at 255 because continuous tone values are represented by eight bit diqital quantities). At this point, the variable n is equal to zero and, therefore, the variable n is not equal to $n_{max}$. Accordingly, a block 74 increments the variable n by one, and the program 50 returns to the block 56 to process the new initial matrix with the variable n now set to one. The program 50 is repeated for each increment of the variable n. A further constraint on the program 50 is that, if an element in the initial matrix has been switched during a previous pass through the program 50, that element cannot be switched again. Thus, if the block 66 would otherwise switch a previously switched element, it must instead switch the next larger smallest element and/or the next smaller largest element, as appropriate. When the variable n is equal to $n_{max}$ as determined by the block 74, the program 50 is ended. The result is the matrix MAT which acts as a filter having its low frequency components suppressed.

It should also be noted that the second parts of equations (1) and (2) involve the application of a first filter W, whereas the third parts of equations (1) and (2) involve the application of a second filter in the form of the matrix Mat.

Certain modifications of the present invention have been discussed above. Other modifications of the present invention will occur to those skilled in the art. For example, while the errors $e_0$ and $e_1$ are described above as being diffused in the pattern similar to that taught by Floyd and Steinberg, any other appropriate diffusion pattern may be used.

Also, the errors $e_0$ and $e_1$ are described above as being determined in accordance with equations (1), (2), (4), and (5). However, any other suitable methods may be used to determine the errors $e_0$ and $e_1$.

Moreover, instead of calculating the value of $\gamma$ using equation (3) or any other suitable equation at the time that a continuous tone value is converted, a look up table may be generated beforehand which contains a value of $\gamma$ for each of the 256 possible continuous tone values. Thus, when a continuous tone value undergoes conversion, the magnitude of that continuous tone value is used to address the look up table to select a corresponding value of γ. This look up table may be stored in the memory 14

Furthermore, as shown in FIG. 6, γ varies only in the region where $C_{i,j}$ is less than about twenty, i.e. at the lower end of the range of $C_{i,j}$. However, equation (3) may be arranged to provide a similar region at the upper end of the range of $C_{i,j}$. Additionally, the block 64 in FIG. 5 may be omitted because the function of determining which elements in the convolution matrix are largest and smallest may be performed by the block 66 without sorting.

Also, there are known marking devices which respond to output values having more than two levels. Therefore, while the present invention has been particularly described in relation to the conversion of continuous tone values to output values having one of two levels, i.e. to binary values, the present invention is also applicable to the conversion of continuous tone values to output values having more than two levels. For example, the present invention is applicable to the conversion of continuous tone values to output values having three levels which, for convenience, may be denoted as r, s, and t. In the case of converting continuous tone values to output values having these three levels, the program 20 shown in FIG. 4 should be modified to determine three errors, i.e. $e_r$, $e_s$, and $e_t$. The error $e_r$ is determined as in the case of equations (1), (2), (3), and (4) but with an assumed output value of r, the error $e_s$ is determined as in the case of equations (1), (2), (3), and (4) but with an assumed output value of s, and the error $e_t$ is determined as in the case of equations (1), (2), (3), and (4) but with an assumed output value of t. The continuous tone value undergoing conversion is set to an output value of r if the error $e_r$ is smaller than the error $e_s$ and the error $e_t$, the continuous tone value undergoing conversion is set to an output value of s if the error $e_s$ is smaller than the error $e_r$ and the error $e_t$, and the continuous tone value undergoing conversion is set to an output value of t if the error $e_t$ is smaller than the error $e_r$ and the error $e_s$. If the continuous tone value undergoing conversion is set to an output value of r, the error $e_r$ is diffused; if the continuous tone value undergoing conversion is set to an output value of s, the error $e_s$ is diffused; and, if the continuous tone value undergoing conversion is set to an output value of t, the error $e_t$ is diffused.

Additionally, with respect to the program 20 shown in FIG. 4, binary values are predicted as they are needed to convert a continuous tone value to a binary value. Instead, all binary values that are necessary to convert all continuous tone values to binary values may be predicted initially. In this case, when the block 36 determines that not all continuous tone values have been converted, the program 20 returns to the block 24 instead of to the block 22.

All such modifications are intended to be within the scope of the present invention.

We claim:

1. A method of converting continuous tone values to output values comprising the following steps:

a) applying a first filter to a continuous tone value if the continuous tone value has a magnitude greater than a criterion;

b) applying a second filter to the continuous tone value if the continuous tone value has a magnitude smaller than the criterion, wherein the first and second filters are different; and c) setting the continuous tone value to an output value depending upon the results from steps a) and b);

wherein step a) comprises the steps of generating, if the continuous tone value has a magnitude greater than the criterion, a first error based upon a difference between the continuous tone value and a value derived by applying the first filter to an assumed output value of zero for the continuous tone value, and a second error based upon a difference between the continuous tone value and a value derived by applying the first filter to an assumed output value of one for the continuous tone value, wherein step b) comprises the steps of generating, if the continuous tone value has a magnitude smaller than the criterion, a third error based upon a difference between the continuous tone value and a value derived from the second filter dependent upon the continuous tone value, and a fourth error based upon a difference between the continuous tone value and a value derived from the second filter dependent upon the continuous tone value, and wherein step c) comprises the steps of setting the continuous tone value to an output value of zero if the first error is less than the second error, setting the continuous tone value to an output value of one if the first error is oreater than the second error, setting the continuous tone value to an output value of zero if the third error is less than the fourth error, and setting the continuous tone value to an output value to an output value of one if the third error is greater than the fourth error, as appropriate.

2. The method of claim 1 wherein the second filter comprises a plurality of values having suppressed low frequency components.

3. The method of claim 2 further comprising the steps of diffusing the first error if the continuous tone value is set to an output value of zero, of diffusing the second error if the continuous tone value is set to an output value of one, of diffusing the third error if the continuous tone value is set to an output value of zero, and of diffusing the fourth error if the continuous tone value is set to an output value of one, as appropriate.

4. A method of converting continuous tone values to output values comprising the following steps:

a) applying a first filter to a continuous tone value if the continuous tone value has a magnitude greater than a criterion;

b) applying a second filter to the continuous tone value if the continuous tone value has a magnitude smaller than the criterion, wherein the first and second filters are different; and c) setting the continuous tone value to an output value depending upon the results from steps a) and b);

Wherein step a) comprises the steps of generating a first error based upon a difference between (I) the continuous tone value, (ii) a value derived from the second filter dependent upon the continuous tone value, and (iii) a value derived by applying the first filter to an assumed output value of zero for the continuous tone value, and generating a second error based upon a difference between (I) the continuous tone value, (ii) a value derived from the second filter dependent upon the continuous tone value, and (iii) a value derived by applying the first filter to an assumed output value of one for the continuous tone value, and wherein step c) comprises the steps of setting the continuous tone value to an output value of zero if the first error is less than the second error, and setting the continuous tone value to an output value of one if the first error is greater than the second error.

5. The method of claim 4 wherein all parts (ii) above are multiplied by 1−γ, wherein all parts (iii) above are multiplied by γ, wherein γ is given by the expression $$1 - \gamma[C_{i,j}] = \frac{1}{1 + \left(\frac{C_{i,j}}{Cut}\right)^{2\alpha}}$$

wherein $C_{i,j}$ is a corresponding continuous tone value, and wherein $\alpha$ and Cut are constants.

6. The method of claim 4 wherein the second filter comprises a plurality of values having suppressed low frequency components.

7. The method of claim 6 further comprising the steps of diffusing the first error if the continuous tone value is set to an output value of zero, and of diffusing the second error if the continuous tone value is set to an out-put value of one.

8. A method of converting continuous tone values to output values for rendering in the same reproduction comprising the following steps:
   a) converting a group of continuous tone values to a first group of output values if the continuous tone values of the group of continuous tone values are greater than a predetermined level, wherein the output values of the first group of output values, when rendered, produces dots in a substantially random pattern; and
   b) converting the group of continuous tone values to a second group of output values if the continuous tone values of the group of continuous tone values are less than the predetermined level, wherein the output values of the second group of output values, when rendered, produces dots in a substantially even pattern;
   wherein the steps a) and b) comprises the following steps:
      generating first errors based upon first, second, and third parts, wherein the first part is based upon the continuous tone values of the group of continuous tone values, wherein the second part is based upon (I) previously converted continuous tone values neighboring corresponding continuous tone values of the group of continuous tone values, (ii) yet to be converted continuous tone values neighboring corresponding continuous tone values of the group continuous tone values, and (iii) output values having an assumed first level for the corresponding continuous tone values of the group of continuous tone values, and wherein the third part is based upon values selected from a filter dependent upon corresponding continuous tone values of the group of continuous tone values;
      generating second errors based upon the first part, the third part, and a fourth part, wherein the fourth part is based upon (I) previously converted continuous tone values neighboring corresponding continuous tone values of the group of continuous tone values, (ii) yet to converted continuous tone values neighboring corresponding continuous tone values of the group of continuous tone values, and (iii) output values having an assumed second level for the corresponding continuous tone values of the group of continuous tone values;
      setting those continuous tone values of the group of continuous tone values to output values having the first level if corresponding ones of the first errors are less than corresponding ones of the second errors and setting those continuous tone values of the group of continuous tone values to output values having the second level if corresponding ones of the first errors are greater than corresponding ones of the second errors.

9. The method of claim 8 wherein the third parts are multiplied by 1−γ, wherein the second and fourth parts are multiplied by γ, wherein γ is given by the expression $$1 - \gamma[C_{i,j}] = \frac{1}{1 + \left(\frac{C_{i,j}}{Cut}\right)^{2\alpha}},$$

wherein $C_{i,j}$ is a corresponding continuous tone value, wherein $\alpha$ and Cut are constants, and wherein step c) is dependent upon Cut.

10. The method of claim 8 wherein the filter comprises a plurality of values having suppressed low frequency components.

11. The method of claim 10 further comprising the steps of diffusing the first errors if the corresponding continuous tone values are set to output values having the first level, and of diffusing the second errors if the corresponding continuous tone values are set to the output values hating the second level.

12. The method of claim 8 wherein steps a) and b) are dependent upon first and second filters.

13. The method of claim 12 wherein the first filter is applied primarily in step a) and wherein the second filter is applied primarily in step b).

14. The method of claim 13 wherein the second filter is comprised of filter values which are selected from the second filter based upon corresponding continuous tone values.

15. The method of claim 14 wherein the second filter comprises a plurality of values having suppressed low frequency components.

16. A system for converting an input value undergoing conversion to an output value, the system comprising:
   first error generating means for generating a first error for the input value undergoing conversion, wherein the first error is based upon first and second parts, wherein the second part is based upon an output value having an assumed first level for the input value undergoing conversion, and wherein the first and second parts are conversely related;
   second error generating means for generating a second error for the input value undergoing conversion, wherein the second error is based upon the first part and a third part, wherein the third part is based upon an output value having an assumed second level for the input value undergoing conversion, and wherein the first and third parts are conversely related; and,
   output value setting means for setting the input value undergoing conversion to an output value having the first level if the first error is less than the second error and to an output value having the second level if the first error is greater than the second error.

17. The system of claim 16 wherein the first error generating means generates the first error based upon the input value undergoing conversion, the first part, and the second part, wherein the second part is based upon (i) a selected number of output values corresponding to input values previously converted, (ii) output values predicted for a selected number of input values yet to be converted, and (iii) an output value having an assumed first level for the input value undergoing conversion, and wherein the second error generating means generates the second error based upon the input value undergoing conversion, the first part, and the third part, wherein the third part is based upon (i) the selected number of output values corresponding to input values previously converted, (ii) the output values predicted for the selected number of input values yet to be converted, and (iii) an output value having an assumed second level for the input value undergoing conversion.

18. The system of claim 17 wherein the first part is a value based upon the input value undergoing conversion.

19. The system of claim 18 wherein the value based upon the input value undergoing conversion is a matrix value which is selected from a matrix dependent upon the input value undergoing conversion.

20. The system of claim 19 wherein the matrix is arranged to affect the output value to which the input value is converted only when the input value undergoing conversion is within a predetermined range of input values.

21. The system of claim 20 wherein the first part is multiplied by 1−γ, wherein the second and third parts are multiplied by γ, wherein γ is given by the expression $$1 - \gamma[C_{i,j}] = \frac{1}{1 + \left(\frac{C_{i,j}}{Cut}\right)^{2\alpha}},$$

wherein $C_{i,j}$ is the input value undergoing conversion, and wherein $\alpha$ and Cut are constants.

22. The system of claim 16 wherein the first part is multiplied by 1−γ, wherein the second and third parts are multiplied by γ.

23. The system of claim 22 wherein the first part is a value based upon the input value undergoing conversion.

24. The system of claim 23 wherein the value based upon the input value undergoing conversion is a matrix value which is selected from a matrix dependent upon the input value undergoing conversion.

25. The system of claim 24 wherein the matrix is arranged to affect the output value to which the input value is converted only when the input value undergoing conversion is within a predetermined range of input values.

26. The system of claim 25 wherein γ is given by the expression $$1 - \gamma[C_{i,j}] = \frac{1}{1 + \left(\frac{C_{i,j}}{Cut}\right)^{2\alpha}},$$

wherein $C_{i,j}$ is the input value undergoing conversion, and wherein $\alpha$ and Cut are constants.

27. The system of claim 16 wherein the first part is a value based upon the input value undergoing conversion.

28. The system of claim 27 wherein the value based upon the input value undergoing conversion is a matrix value which is selected from a matrix dependent upon the input value undergoing conversion.

29. The system of claim 28 wherein the matrix is arranged to affect the output value to which the input value is converted only when the input value undergoing conversion is within a predetermined range of input values.

30. The system of claim 16 further comprising error diffusing means for diffusing the first error if the input value undergoing conversion is set to the output value having the first level and for diffusing the second error if the input value undergoing conversion is set to the output value having the second level.

31. A system for converting an input value undergoing conversion to an output value, the system comprising:

first error generating means for generating a first error for the input value undergoing conversion, wherein the first error is based upon first and second parts, wherein the first part is based upon a filter, wherein the second part is based upon an output value having an assumed first level for the input value undergoing conversion, and wherein the first and second parts are conversely related;

second error generating means for generating a second error for the input value undergoing conversion, wherein the second error is based upon third and fourth parts, wherein the third part is based upon the filter, wherein the fourth part is based upon an output value having an assumed second level for the input value undergoing conversion, and wherein the third and fourth parts are conversely related; and, output value setting means for setting the input value undergoing conversion to an output value having the first level if the first error is less than the second error and to an output value having the second level if the first error is greater than the second error.

32. The system of claim 31 wherein the first error generating means generates the first error based upon the input value undergoing conversion, the first part, and the second part, wherein the second part is based upon (i) a selected number of output values corresponding to input values previously converted, (ii) output values predicted for a selected number of input values yet to be converted, and (iii) an output value having an assumed first level for the input value undergoing conversion, and wherein the second error generating means generates the second error based upon the input value undergoing conversion, the third part, and the fourth part, wherein the fourth part is based upon (i) the selected number of output values corresponding to input values previously converted, (ii) the output values predicted for the selected number of input values yet to be converted, and (iii) an output value having an assumed second level for the input value undergoing conversion.

33. The system of claim 32 wherein the first and third parts are a value based upon the input value undergoing conversion.

34. The system of claim 33 wherein the value based upon the input value undergoing conversion is a filter value which is selected from the filter dependent upon the input value undergoing conversion.

35. The system of claim 34 wherein the filter is arranged to affect the output value to which the input value undergoing conversion is converted only when the input value undergoing conversion is within a predetermined range of input values.

36. The system of claim 35 wherein the filter comprises a plurality of values having suppressed low frequency components.

37. The system of claim 36 wherein the first and third parts are multiplied by 1−γ, wherein the second and fourth parts are multiplied by γ, wherein γ is given by the expression $$1 - \gamma[C_{i,j}] = \frac{1}{1 + \left(\frac{C_{i,j}}{Cut}\right)^{2\alpha}}$$

wherein $C_{i,j}$ is the input value undergoing conversion, and wherein $\alpha$ and Cut are constants.

38. The system of claim 31 wherein the first and third parts are multiplied by 1−γ, and wherein the second and fourth parts are multiplied by γ.

39. The system of claim 38 wherein the first and third parts are a value based upon the input value undergoing conversion.

40. The system of claim 39 wherein the value based upon the input value undergoing conversion is a filter value which is selected from the filter dependent upon the input value undergoing conversion.

41. The system of claim 40 wherein the filter is arranged to affect the output value to which the input value undergoing conversion is converted only when the input value undergoing conversion is within a predetermined range of input values.

42. The system of claim 41 wherein the filter comprises a plurality of values having suppressed low frequency components.

43. The system of claim 42 wherein γ is given by the expression $$1 - \gamma[C_{i,j}] = \frac{1}{1 + \left(\dfrac{C_{i,j}}{Cut}\right)^{2\alpha}},$$

wherein $C_{i,j}$ is the input value undergoing conversion, and wherein α and Cut are constants.

44. The system of claim 31 wherein the first and third parts are a value based upon the input value undergoing conversion.

45. The system of claim 44 wherein the value based upon the input value undergoing conversion is a filter value which is selected from the filter dependent upon the input value undergoing conversion.

46. The system of claim 45 wherein the filter is arranged to affect the output value to which the input value undergoing conversion is converted only when the input value undergoing conversion is within a predetermined range of input values.

47. The system of claim 46 wherein the filter comprises a plurality of values having suppressed low frequency components.

48. The system of claim 31 further comprising error diffusing means for diffusing the first error if the input value undergoing conversion is set to the output value having the first level and for diffusing the second error if the input value undergoing conversion is set to the output value having the second level.

49. The system of claim 31 wherein the filter comprises a plurality of values having suppressed low frequency components.

50. A screenless conversion method for converting continuous tone values to output values representing dots to be rendered by a marking device, wherein the continuous tone values range between values of M and N, and wherein the screenless conversion method comprises the following steps:

a) determining first errors corresponding to the continuous tone values so that the first errors produce generally evenly distributed dots for continuous tones values between about M and about Cut and so that the first errors produce generally randomly distributed dots for continuous tones values between about Cut and about N, wherein Cut is a value between M and N, and wherein the first errors are based upon an output value having an assumed first level for the continuous tone values;

b) determining second errors corresponding to the continuous tone values so that the second errors produce generally evenly distributed dots for continuous tones values between about M and about Cut and so that the second errors produce generally randomly distributed dots for continuous tones values between about Cut and about N, wherein the second errors are based upon an output value having an assumed second level for the continuous tone values;

c) setting those continuous tone values whose corresponding first errors are less than their corresponding second errors to output values having the first level; and, d) setting those continuous tone values whose corresponding first errors are greater than their corresponding second errors to output values having the second level.

51. The screenless conversion method of claim 50 wherein step a) comprises the step of generating each of the first errors based upon a corresponding continuous tone value, a corresponding first part, and a corresponding second part, wherein the corresponding second part is based upon (i) a selected number of output values corresponding to previously converted continuous tone values, (ii) output values predicted for a selected number of continuous tone values yet to be converted, and (iii) an output value having the assumed first level for the continuous tone value, and wherein step b) comprises the step of generating each of the second errors based upon a corresponding continuous tone value, the corresponding first part, and a corresponding third part, wherein the corresponding third part is based upon (i) the selected number of output values corresponding to previously converted continuous tone values, (ii) the output values predicted for the selected number of continuous tone values yet to be converted, and (iii) an output value having the assumed second level for the continuous tone value.

52. The screenless conversion method of claim 51 wherein the corresponding first part is multiplied by 1−γ, wherein the corresponding second and third parts are multiplied by γ, wherein γ is given by the expression $$1 - \gamma[C_{i,j}] = \frac{1}{1 + \left(\dfrac{C_{i,j}}{Cut}\right)^{2\alpha}},$$

wherein $C_{i,j}$ is a continuous tone value, and wherein α and Cut are constants.

53. The screenless conversion method of claim 52 wherein the corresponding first part is a value based upon a corresponding continuous tone value.

54. The screenless conversion method of claim 53 wherein the value based upon a corresponding continuous tone value is a filter value which is selected from a filter dependent upon the corresponding continuous tone value.

55. The screenless conversion method of claim 54 wherein the filter is arranged to affect the output values to which corresponding continuous tone values are converted only when the corresponding continuous tone values have magnitudes between about M and about Cut.

56. The screenless conversion method of claim 55 wherein the filter comprises a plurality of values having suppressed low frequency components.

57. The screenless conversion method of claim 50 wherein the corresponding first part is multiplied by 1−γ, and wherein the corresponding second and third parts are multiplied by γ.

58. The screenless conversion method of claim 57 wherein the corresponding first part is a value based upon a corresponding continuous tone value.

59. The screenless conversion method of claim 58 wherein the value based upon a corresponding continuous tone value is a filter value which is selected from a filter dependent upon the corresponding continuous tone value.

60. The screenless conversion method of claim 59 wherein the filter is arranged to affect the output values to which corresponding continuous tone values are converted only when the corresponding continuous tone values have magnitudes between about M and about Cut.

61. The screenless conversion method of claim 60 wherein the filter comprises a plurality of values having suppressed low frequency components.

62. The screenless conversion method of claim 61 wherein γ is given by the expression $$1 - \gamma[C_{i,j}] = \frac{1}{1 + \left(\frac{C_{i,j}}{Cut}\right)^{2\alpha}},$$

wherein $C_{i,j}$ is a continuous tone value, and wherein α and Cut are constants.

63. The screenless conversion method of claim 50 wherein the corresponding first part is a value based upon a corresponding continuous tone value.

64. The screenless conversion method of claim 63 wherein the value based upon a corresponding continuous tone value is a filter value which selected from a filter dependent upon the corresponding continuous tone value.

65. The screenless conversion method of claim 64 wherein the filter is arranged to affect the output values to which corresponding continuous tone values are converted only when the corresponding continuous tone value have magnitudes between about M and about Cut.

66. The screenless conversion method of claim 65 wherein the filter comprises a plurality of values having suppressed low frequency components.

67. The screenless conversion method of claim 50 further comprising error diffusing means for diffusing the first errors when corresponding continuous tone values are set to output values having the first level and for diffusing the second errors when corresponding continuous tone values are set to the output values having the second level.

68. A system for converting one input value of a series of input values to an output value wherein previous input values have been converted to previous output values and subsequent input values are to be converted to output values, the system comprising:

first error generating means for generating a first error for the one input value, wherein the first error is based upon (i) the one input value, (ii) a selected number of previous output values, output values predicted for a selected number of subsequent input values, and an output value having an assumed first level for the one input value, and (iii) an output value having an assumed second level for the one input value; and, second error generating means for generating a second error for the one input value, wherein, the second error is based upon (i) the one input value, (iv) the selected number of previous output values, the output values predicted for the selected number of subsequent input values, and an output value having an assumed third level for the one input value, and (iii) the output value having the assumed second level for the one input value; and, output value setting means for setting the one input value to an output value having the first level if the first error is less than the second error and to an output value having the third level if the first error is greater than the second error.

69. The system of claim 68 wherein part (iii) is multiplied by 1−γ, wherein parts (ii) and (iv) are multiplied by γ, wherein γ is given by the expression $$1 - \gamma[C_{i,j}] = \frac{1}{1 + \left(\frac{C_{i,j}}{Cut}\right)^{2\alpha}},$$

wherein $C_{i,j}$ is the one input value, and wherein α and Cut are constants.

70. The system of claim 69 wherein the output value having the assumed second level is selected from a matrix based upon the one input value.

71. The system of claim 70 wherein the output value having the assumed second level is arranged to affect the output value to which the one input value is converted when the one input value is within a predetermined range of input values.

72. The system of claim 71 wherein the matrix comprises a plurality of values having suppressed low frequency components.

73. The system of claim 68 wherein the output value having the assumed second level is a value based upon the one input value.

74. The system of claim 73 wherein the value based upon the one input value is a matrix value selected from a matrix based upon the one input value.

75. The system of claim 74 wherein the output value having the assumed second level is arranged to affect the output value to which the one input value is converted when the one input value is within a predetermined range of input values.

76. The system of claim 75 wherein the matrix comprises a plurality of values having suppressed low frequency components.

77. The system of claim 68 further comprising error diffusing means for diffusing the first error if the one input value is set to the output value having the first level and for diffusing the second error if the one input value is set to the output value having the third level.

* * * * *